(12) United States Patent
Schneider et al.

(10) Patent No.: US 12,028,012 B2
(45) Date of Patent: Jul. 2, 2024

(54) METHOD OF OPERATING A STEPPER MOTOR IN A DENTAL TOOL MACHINE

(71) Applicant: DENTSPLY SIRONA Inc., York, PA (US)

(72) Inventors: Hans-Christian Schneider, Einhausen (DE); Daniel Trautmann, Bad König (DE)

(73) Assignee: DENTSPLY SIRONA INC., York, PA (US)

( * ) Notice: Subject to any disclaimer, the term of this patent is extended or adjusted under 35 U.S.C. 154(b) by 195 days.

(21) Appl. No.: 17/626,252

(22) PCT Filed: Jul. 8, 2020

(86) PCT No.: PCT/EP2020/069262
§ 371 (c)(1),
(2) Date: Jan. 11, 2022

(87) PCT Pub. No.: WO2021/005115
PCT Pub. Date: Jan. 14, 2021

(65) Prior Publication Data
US 2022/0278635 A1 Sep. 1, 2022

(30) Foreign Application Priority Data
Jul. 11, 2019 (EP) .................... 19185676

(51) Int. Cl.
*H02P 8/18* (2006.01)
*A61C 13/00* (2006.01)

(52) U.S. Cl.
CPC ............ *H02P 8/18* (2013.01); *A61C 13/0004* (2013.01)

(58) Field of Classification Search
CPC .......... H02P 8/18; H02P 8/32; A61C 13/0004; A61C 13/0006
(Continued)

(56) References Cited

U.S. PATENT DOCUMENTS 6,054,835 A * 4/2000 Thiemann ................. H02P 8/34
400/279
6,806,675 B2 * 10/2004 Wang ........................ H02P 8/22
318/434

(Continued)

FOREIGN PATENT DOCUMENTS

CN 101678551 A 3/2010
CN 109154806 A 1/2019

(Continued)

OTHER PUBLICATIONS

International Search Report; PCT/EP2020/069262; Aug. 5, 2020 (completed); Aug. 13, 2020 (mailed).

(Continued)

*Primary Examiner* — David Luo
(74) *Attorney, Agent, or Firm* — DENTSPLY SIRONA INC.

(57) ABSTRACT

A method of operating a stepper motor for use in a dental tool machine for removing material from a dental blank, the method including: a step of adapting torque reserves of the stepper motor at operating points to net load moments respectively. The method includes a first step of predicting, through simulation, the net load moments beforehand; a second step of predicting, through simulation, the supply current to be supplied to the stepper motor for setting up the torque reserves that correspond to the predicted net load moments respectively; and a step of driving the stepper motor based on the predicted supply current.

18 Claims, 3 Drawing Sheets

(58) Field of Classification Search
USPC .................................. 318/696, 685, 671, 560
See application file for complete search history.

(56) References Cited

U.S. PATENT DOCUMENTS

| | | | |
|---|---|---|---|
| 7,116,074 B2 * | 10/2006 | Kuo .......................... | H02P 8/38 |
| | | | 310/49.01 |
| 8,527,092 B2 | 9/2013 | Hacker | |
| 10,401,823 B2 | 9/2019 | Wang | |
| 10,485,327 B2 * | 11/2019 | Lyngstadaas ............ | A46B 5/02 |
| 2010/0198405 A1 | 8/2010 | Hacker | |
| 2014/0295378 A1 | 10/2014 | Lyngstadaas et al. | |
| 2015/0097305 A1 | 4/2015 | Hufschmied | |
| 2017/0227945 A1 | 8/2017 | Wang | |

FOREIGN PATENT DOCUMENTS

| | | |
|---|---|---|
| RU | 2192807 C2 | 11/2002 |
| RU | 2232559 C2 | 7/2004 |

OTHER PUBLICATIONS

International Preliminary Report on Patentability; PCT/EP2020/069262; Aug. 5, 2020 (completed); Aug. 13, 2020 (mailed).
Written Opinion of the International Searching Authority; PCT/EP2020/069262; Aug. 5, 2020 (completed); Aug. 13, 2020 (mailed).
Russian Office Action dated Nov. 11, 2023.
Chinese Office Action dated Jan. 24, 2024.

* cited by examiner

METHOD OF OPERATING A STEPPER MOTOR IN A DENTAL TOOL MACHINE

CROSS-REFERENCE TO RELATED APPLICATIONS

This is a National Phase application of International Application No. PCT/EP2020/069262, filed Jul. 8, 2020 which claims the benefit of and priority to European Application Ser. No. 191856764, filed on. Jul. 11, 2019, which are herein incorporated by reference for all purposes.

TECHNICAL FIELD OF THE INVENTION

The present invention relates to a dental machining system having a dental tool machine for removing material from a dental blank. The present invention more particularly relates to a method of operating a stepper motor in a dental tool machine for removing material from a dental blank.

BACKGROUND OF THE INVENTION

Tool machining systems, in particular dental tool machining systems are commonly known in the art. A dental tool machining system generally comprises: a dental tool machine for removing material from at least one dental blank, wherein the dental tool machine has one or more stepper motors for driving a carriage that movably holds one or more dental tools and one or more stepper motors for driving a retainer which movably holds the dental blank; and a control means for operating the stepper motors.

It is common practice to analyze and verify the tool path before and/or during the actual machining so as to operate the dental tool machine within the safe limits.

For instance, US 2017/0227945A1 discloses a tool machine and an NC program which can be executed to cause the tool machine to machine a workpiece. The machine tool axes are servo controlled. In particular, the NC program is revised through a simulation if the machine limits are exceeded during the machining. Furthermore, the feed rates are changed in accordance with a real time simulation if dynamical limits are exceeded.

Despite of the necessity of operating the tool machines within the safe limits, it is also important to perform the machining under optimal conditions.

The above mentioned stepper motor of a dental tool machine is usually operated with torque reserve, i.e., the supply current is statically adjusted to have enough torque reserve available at all operating points of the entire process so that no step losses occur. Thereby the inputted power remains approximately constant. At operating points where the input power is not fully retrieved by the load, the excess power is converted into heat and resonance vibrations. The resonance vibrations are undesirable when the stepper motor is used as a drive in the dental tool machine. It leads to noise and dental tool vibrations, which can lead to surface artifacts. This disadvantage of stepper motors can be avoided through regulation. The stepper motor can be regulated in a field-oriented manner by using rotary encoders. Regulation systems for stepper motors are generally known and are commercially marketed for example by Nanotec®. However, an optimally controlled system is, in general, dynamically superior to a regulated one since a regulation is always performed in response to a regulation deviation.

SUMMARY

An objective of the present invention is to overcome the disadvantages of the prior art and provide a method of operating, without any rotary encoder-based regulation, one or more stepper motors for use in a dental tool machine so as to achieve machining in an energy-optimized manner, in particular without use of excessive supply current to the stepper motor.

This objective has been achieved through the method as defined in claim 1. The dependent claims relate to further developments.

The present invention provides a method of operating at least one stepper motor for use in a dental tool machine for removing material from a dental blank. The method comprises a step of adapting torque reserves of the stepper motor at operating points to net load moments respectively without any rotary encoder-based regulation. The method is characterized by comprising: a first step of predicting, through simulation, the net load moments beforehand; a second step of predicting, through simulation, the supply current to be supplied to the stepper motor for setting up the torque reserves that correspond to the predicted net load moments respectively; and a step of driving the stepper motor based on the predicted supply current.

A major advantageous effect of the present invention is that the stepper motor can be operated in an energy-optimized manner since the torque reserve at each operating point is precisely adapted beforehand to the load conditions through simulation. Thereby, a reduction in heat generation, noise generation and tool vibration can be achieved.

According to an embodiment of the present invention, the net load moment corresponds to a superposition of the load moments respectively due to the drive forces arising through the drive train of the respective stepper motor and the machining forces arising through the material removal from the dental blank. Thus, the above-mentioned simulation is a synthesis of a drive train simulation and a material removal simulation. The load moments are predicted in the first predicting step based on a drive train simulation and a material removal simulation of the dynamic acceleration/deceleration along the drive train trajectory that corresponds to the movement of the dental tool, and the dental tool trajectory respectively. According to this embodiment, in the dental tool machine the dental tool trajectory and thus the drive train trajectory of the drive axes involved in the dental tool movement are known in advance. Thus, the load changes in the dynamic acceleration/deceleration processes are predictable. Load changes caused by machining forces or drive forces can be separately estimated through the simulation. The drive forces may include inertial forces and frictional forces in the drive train.

According to an embodiment of the present invention, the supply current is predicted in the second predicting step based on a torque reserve simulation of the dynamic current supply. The dynamic current supply of the stepper motor is modelled to allow prediction of the torque reserves.

According to an embodiment of the present invention, the first and second predicting steps are performed in advance of the driving step. Thereby, it becomes possible to predict the current supply, and thus the torque reserves of the stepper motor of the dental tool machine depending on the operating points by predicting the net load moments through a superposition of the drive forces and machining forces, and to set the current supply with foresight, considering the current supply dynamics. In the present invention, thanks to the above-mentioned simulations the need for using any rotary encoder-based regulation has been obviated and thus the dental tool machine can be optimally controlled in a dynamically superior manner.

According to an embodiment of the present invention, the method further comprises a step of generating an enhanced supply current by adding to the predicted supply current a constant amount and/or by multiplying the predicted supply current through a constant factor greater than one. Thereafter, the stepper motor is driven based on the enhanced supply current. Thanks to the enhanced supply current, uncertainties in the simulation can be safely compensated. As a result, the torque reserves always tends to be greater than zero, but smaller than that would be the case with a constant torque reserve. This combines high operational reliability with improved running smoothness i.e., less noise generation, high surface quality of the product.

According to an embodiment of the present invention, the method further comprises a step of generating based on the predicted supply current, a step shaped supply current having two or more levels. Thereafter the respective stepper motor is driven based on the step shaped supply current or a smoothed step shaped supply current obtained through interpolation, morphing or filtering. For instance, the stepper motor can be controlled by statically switching the torque reserve between the two or more levels. This approach makes it possible to abstract simulation accuracy as desired. In a version of this embodiment, the relatively lower level is used for finishing the dental blank and the relatively higher level is used for roughing the dental blank. In another version of this embodiment, the relatively lower level is used for making partial cut paths in the dental blank and the relatively higher level is used for making full cut paths in the dental blank. In another version of this embodiment, the relatively lower level is used for machining with a first type of dental tool and the relatively higher level is used for machining with a second type of dental tool different than the first type of dental tool. In another version of this embodiment, the relatively lower level is used for lubricated machining of the dental blank and the relatively higher level is used for dry machining of the dental blank. In another version of this embodiment, the relatively lower level is used for a first revolution speed of the dental tool and the relatively higher level is used for a second revolution speed of the dental tool different than the first revolution speed. In another version of this embodiment, the relatively lower level is used for a first type of material of the dental blank and the relatively higher level is used for a second type of material of the dental blank different than the first type of material. In another version of this embodiment, the relatively lower level is used for a relatively low acceleration of a carriage of the dental tool and the relatively higher level is used for a relatively high acceleration of the carriage of the dental tool. In another version of this embodiment, the relatively lower level is used for a first velocity of a carriage of the dental tool and a relatively higher level is used for a second velocity of a carriage of the dental tool different than the first velocity. In another version of this embodiment, the relatively lower level is used for a low jerk in the trajectory of a carriage of the dental tool and a relatively higher level is used for a high jerk in the trajectory of the carriage of the dental tool.

The present invention also provides a dental machining system which comprises: a dental tool machine for removing material from the dental blank, wherein the dental tool machine has one or more stepper motors for driving a carriage that movably holds one or more dental tools, and a control means for selectively operating the stepper motors. The carriage preferably has a rotatable and translatable shaft and an arm radially linked to the shaft. Each dental tool is preferably driven by a separate dental tool spindle motor such as a bldc motor, positioned on the arm. The stepper motors are respectively arranged to rotate and translate the shaft, and thereby move the arm. The dental tool is adapted for either milling, grinding, polishing or drilling. The dental blank is detachably mountable to a shaft, through a retainer, which is preferably rotatable and translatable. The shaft holding the dental blank is preferably rotationally and translationally movable with respect to the carriage. The dental machining system preferably includes two carriages for allowing parallel machining of a common dental blank from opposite sides. The carriages are preferably translationally and rotationally movable relatively to each other and the dental blank. The control means is further adapted to selectively operate the stepper motors in accordance with the method of the present invention. The control means may be divided in two or more sub control units and distributed over the dental machining system. The sub control units may be connected directly or through a network. The simulation for finding the supply current or related data is preferably performed in a computer that is externally linked to the dental tool machine to save resources. The present invention also provides a program which has computer-readable codes for causing a computer-based dental machining system to carry out the above-mentioned method. The present invention also provides a computer-readable storage which stores the above-mentioned program.

BRIEF DESCRIPTION OF THE DRAWINGS

In the subsequent description, further aspects and advantageous effects of the present invention will be described in more detail by using exemplary embodiments and referring to the drawings, wherein FIG. 1—is a flow diagram showing a method of operating a stepper motor for use in a dental tool machine for removing material from a dental blank according to an embodiment of the present invention.

DETAILED DESCRIPTION OF THE INVENTION

Figure 3:
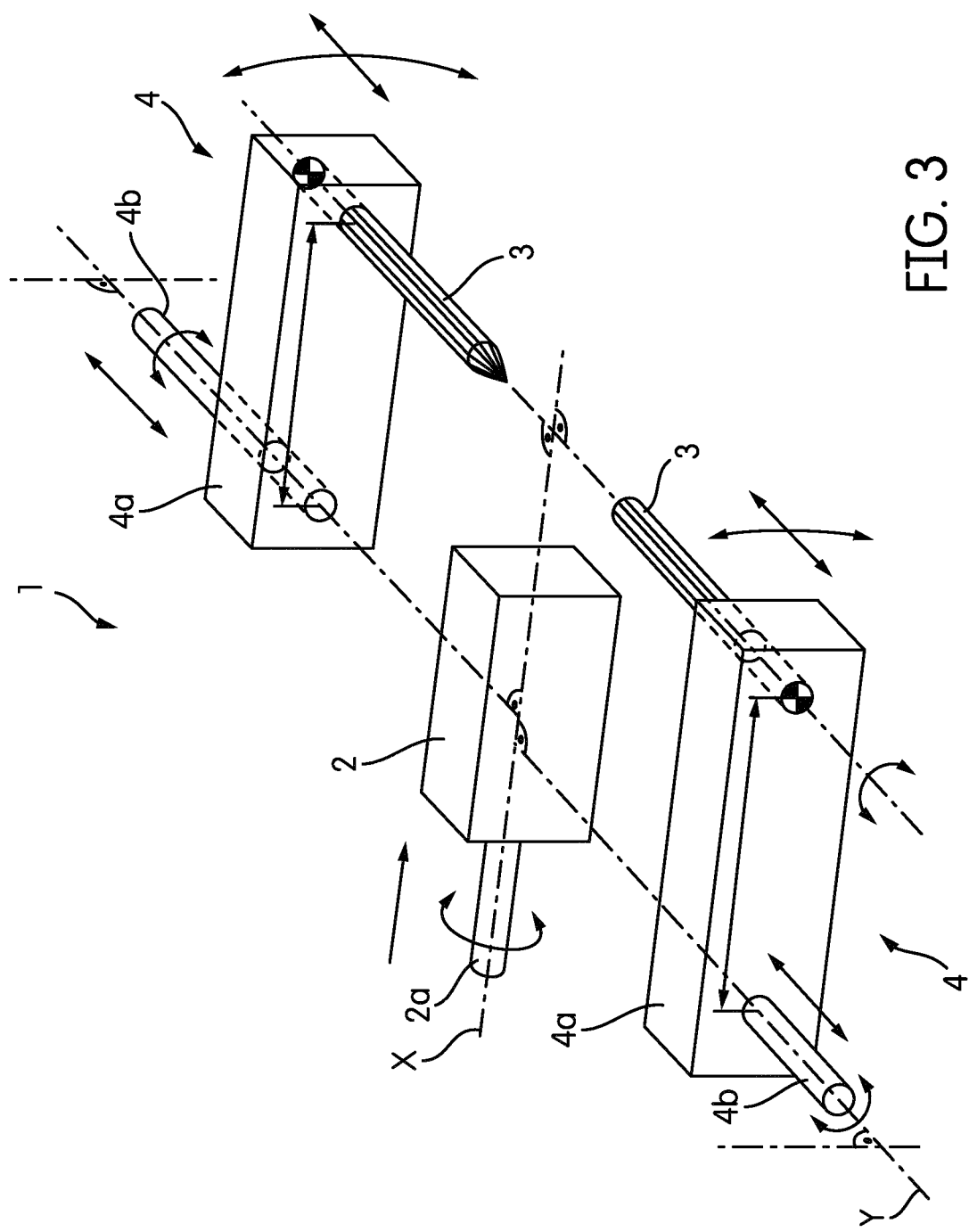
FIG. 3—is a schematic partial perspective view of a dental tool machine according to embodiment of the present invention.

The reference numbers shown in the drawings denote the elements as listed below and will be referred to in the subsequent description of the exemplary embodiments:
1. Dental tool machine
2. Dental blank
   2a. Shaft
3. Dental tool
4. Carriage
   4a. Arm
   4b. Shaft M_net: Net load moment
M_df: Load moment due to the drive force
M_mf: Load moment due to the machining force
I_tr: Supply current setting up the torque reserve
I_tr': Enhanced supply current
I_tr": Step shaped supply current
S_dt: Drive train simulation
S_mr: Material removal simulation
S_tr: Torque reserve simulation An embodiment of a dental machining system is partly shown in FIG. 3. The dental machining system has a dental tool machine (1) for removing material from a dental blank (2). The dental tool machine (1) has two carriages (4) each movably holding a dental tool (3). The carriages (4) are arranged on opposite sides of the dental blank (2). The present invention is not limited to the use of a double carriage (4) and can be alternatively applied to a dental machining system with less or more carriages (4). The dental tools (3) are exchangeable. The user can selectively mount a dental tool (3) for milling, grinding, polishing or drilling and the like. The dental tool machine (1) has preferably two stepper motors (not shown) for driving each carriage (4). The dental machining system also has a control means (not shown) for individually operating the stepper motors, thereby, also allowing simultaneous machining of the dental blank (2). Each carriage (4) has a shaft (4b) and an arm (4a) fixed to the respective shaft (4b). The two stepper motors are linked to the respective shaft (4b) for rotating and translating the same respectively. Each shaft (4b) is rotatable around the y-direction through the respective stepper motor. Each shaft (4b) is translatable along the y-direction through the respective stepper motor. Each arm (4a) extends in the radial direction perpendicular to the y-direction. Each dental tool (3) is driven by a separate dental tool spindle motor (not shown) which is positioned on the respective arm (4a). Each arm (4a) may support one or more dental tools (3). The dental tool spindle motors can be individually controlled by the control means. The dental tools (3) are aligned parallel to the y-direction. The dental blank (2) is detachably attachable through a retainer (not shown) to a shaft (2a) rotatable about the x-direction through a stepper motor (not shown) which is also controlled by the control means. The shaft (2a) that holds the dental blank (2) is also translationally movable along the x-direction relative to the carriage (4) through a stepper motor (not shown) which is also controlled by the control means. The dental blank (2) can be moved into and out of the region between the two dental tools (3). The carriages (4) are translationally and rotationally movable relatively to each other along the y-direction and around the y-direction respectively via the stepper motors which are controlled by the control means.

The present invention provides a method of operating each of the stepper motors in the dental tool machine (1) for removing material from the dental blank (2). The control means is further adapted to individually operate the stepper motors in accordance with the method of the present invention. The present invention provides further a program which has computer readable codes for causing the computer-based dental machining system to carry out the method. The present invention further provides a computer readable storage which stores the program.

Figure 1:
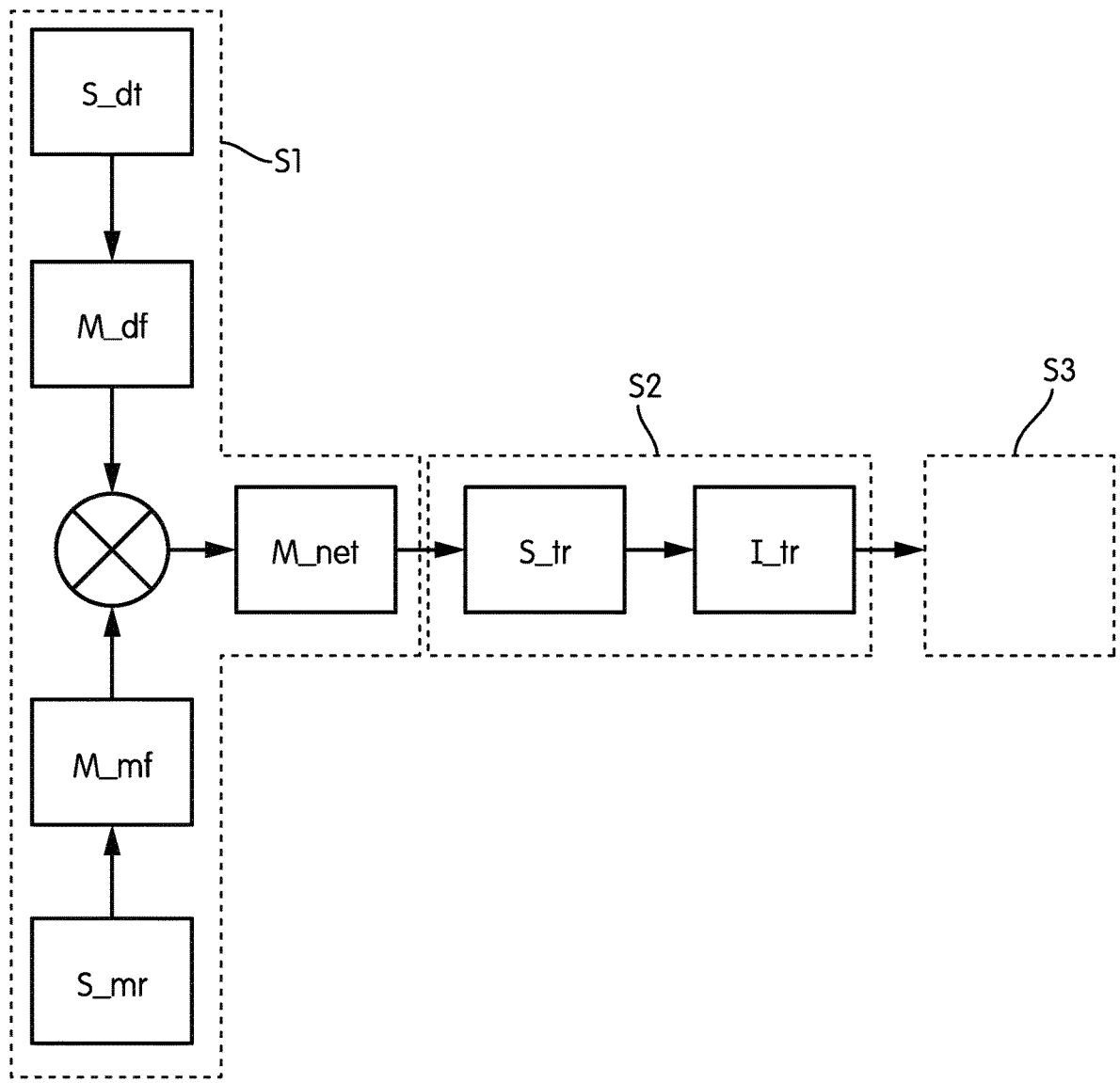

FIG. 1 shows a flow diagram of the method of operating a stepper motor in the dental tool machine (1) for removing material from the dental blank (2) according to an embodiment of the present invention. The torque reserves of the stepper motor at operating points are adapted to net load moments (M_net) respectively. The net load moment is equal to the torque due to the net load acting about the rotational axis (x,y) of the stepper motor i.e., the torque vector is parallel to the rotational axis (x,y). In the present invention this is achieved without any rotary encoder-based regulation. For that reason, the method comprises a first step (S1) of predicting, through simulation, the net load moments (M_net) beforehand; a second step (S2) of predicting, through simulation, the supply current (I_tr) to be supplied to the stepper motor for setting up the torque reserves that correspond to the predicted net load moments (M_net) respectively; and a step (S3) of operating the stepper motor based on the predicted supply current (I_tr).

As shown in FIG. 1, the net load moment (M_net) corresponds to a superposition of the load moments (M_df, M_mf) which are respectively due to the drive forces arising through a drive train of the stepper motor and the machining forces arising through the material removal from the dental blank (2). In the first predicting step (S1), the load moments (M_df, M_mf) are predicted based on a drive train simulation (S_dt) and a material removal simulation (S_mr) of the dynamic acceleration/deceleration along the drive train trajectory corresponding to the movement of the dental tool (3), and the dental tool trajectory respectively. The dental tool trajectory and thus the drive train trajectory of the drive axes involved in the dental tool (3) movement are known in advance for the specific application of interest. The dental tool trajectory may also comprise one or more sections along which no material is removed. In the second predicting step (S2), the supply current (I_tr) is predicted based on a torque reserve simulation (S_tr) of the dynamic current supply. The first and second predicting steps (S1,S2) are performed in advance of the driving step (S3). For instance, the simulation to predict the supply current (I_tr) or related data is preferably performed in a computer that is external to the dental tool machine (1) to save resources. Such computer is linked to the dental tool machine (1) through a wired or wireless data communication line via a network. Alternatively, the simulation may be performed in the dental tool machine (1).

Figure 2:
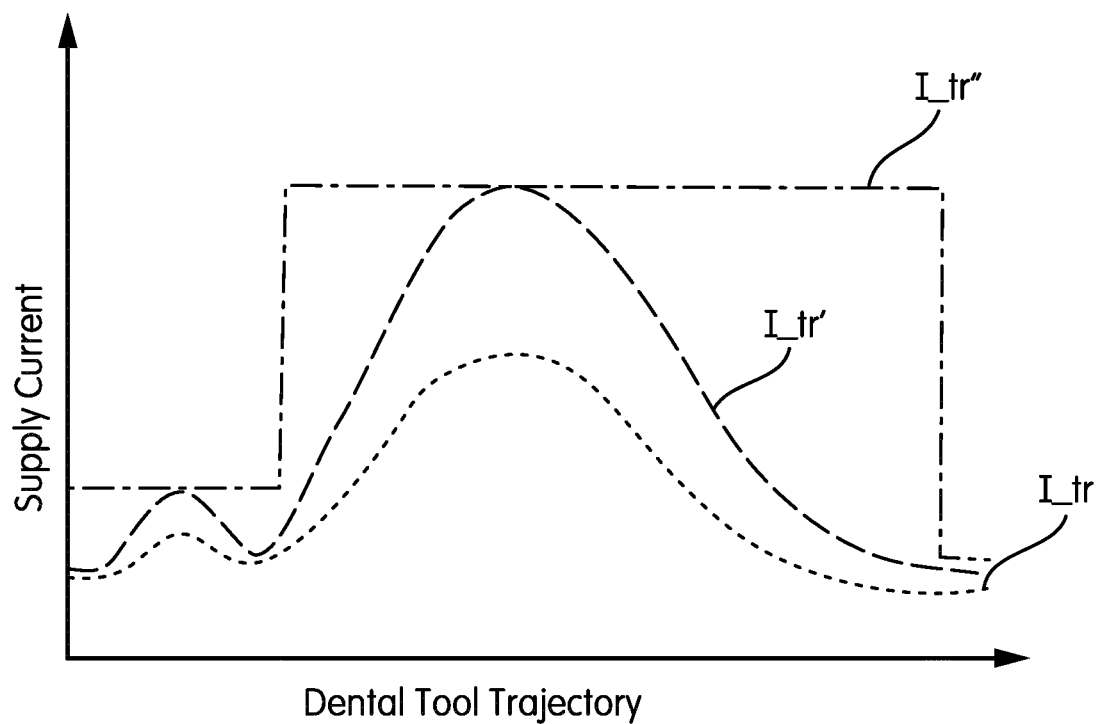
FIG. 2—shows a diagram of a predicted supply current, an enhanced supply current, and a step shaped supply current versus the dental tool trajectory according to embodiment of the present invention.

The method further comprises an optional step of generating an enhanced supply current (I_tr') as shown in FIG. 2, by adding to the predicted supply current (I_tr) a constant amount and/or by multiplying the predicted supply current (I_tr) through a constant factor greater than one. Subsequently, the stepper motor is driven based on the enhanced supply current (I_tr").

The method further comprises an optional step of generating, based on the predicted supply current (I_tr'), a step shaped supply current (I_tr") as shown in FIG. 2. The step shaped supply current (I_tr") has two or more levels. Thereafter, the stepper motor is driven based on the step shaped supply current (I_tr"). Optionally, the step shaped supply current (I_tr") can be further smoothed by means of interpolation, morphing and/or filtering. And the stepper motor can be driven based on the smoothed step shaped supply current (I_tr"). The levels may be utilized in several different machining applications:

In an application, the relatively lower level is used for finishing the dental blank (2) and the relatively higher level is used for roughing the dental blank (2).

In another application, the relatively lower level is used for making partial cut paths in the dental blank (2) and the relatively higher level is used for making full cut paths in the dental blank (2).

In another application, the relatively lower level is used for machining with a first type of dental tool (3) and the relatively higher level is used for machining with a second type of dental tool (3) different than the first type of dental tool (3).

In another application, the relatively lower level is used for lubricated machining of the dental blank (2) and the relatively higher level is used for dry machining of the dental blank (2).

In another application, the relatively lower level is used for a first revolution speed of the dental tool (3) and the relatively higher level is used for a second revolution speed of the dental tool (3) different than the first revolution speed.

In another application, the relatively lower level is used for a first type of material of the dental blank (2) and the relatively higher level is used for a second type of material of the dental blank (2) different than the first type of material.

In another application, the relatively lower level is used for a relatively low acceleration of the carriage (4) of the dental tool (3) and the relatively higher level is used for a relatively high acceleration of the carriage (4) of the dental tool (3).

In another application, the relatively lower level is used for a first velocity of a carriage (4) of the dental tool (3) and a relatively higher level is used for a second velocity of the carriage (4) of the dental tool (3) different than the first velocity.

In another application, the relatively lower level is used for a low jerk in the trajectory of a carriage (4) of the dental tool (3) and a relatively higher level is used for a high jerk in the trajectory of the carriage (4) of the dental tool (3).

The invention claimed is:

1. A method of operating a stepper motor for use in a dental tool machine for removing material from a dental blank, the method comprising: a step of adapting without use of any rotary encoder-based regulation torque reserves of the stepper motor at operating points to net load moments (M_net) about the rotational axis of the stepper motor respectively, wherein the adapting step comprises: a first step (S1) of predicting, through simulation, the net load moments (M_net) beforehand; a second step (S2) of predicting, through simulation, the supply current (I_tr) to be supplied to the stepper motor for setting up the torque reserves that correspond to the predicted net load moments (M_net) respectively; and further comprising: a step (S3) of operating the stepper motor based on the predicted supply current (I_tr), wherein the net load moments (M_net) corresponds to a superposition of the load moments (M_df, M_mf) respectively due to drive forces arising through a drive train of the stepper motor and the machining forces arising through the material removal from the dental blank which are respectively predicted in the first predicting step based on a drive train simulation (S_dt) and a material removal simulation (S_mr) of the dynamic acceleration/deceleration along a drive train trajectory corresponding to the movement of the dental tool, and the dental tool trajectory.

2. The method according to claim 1 wherein the supply current (I_tr) is predicted in the second predicting step (S2) based on a torque reserve simulation (S_tr) of a dynamic current supply.

3. The method according to claim 1, wherein the first and second predicting steps (S1,S2) are performed in advance of the driving step (S3).

4. The method according to claim 1, further comprising: a step of generating an enhanced supply current (I_tr') by adding to the predicted supply current (I_tr) a constant amount and/or by multiplying the predicted supply current (I_tr) through a constant factor greater than one, wherein the stepper motor is driven based on the enhanced supply current (I_tr').

5. The method according claim 1, further comprising: a step of generating a step shaped supply current (I_tr") having two or more levels based on the predicted supply current (I_tr), wherein the stepper motor is driven based on the step shaped supply current (I_tr").

6. The method according to claim 5, wherein the stepper motor is driven based on a smoothed step shaped supply current (I_tr") which is obtained by at least one of interpolation, morphing and filtering thereof.

7. The method according to claim 5, wherein the step shaped supply current (I_tr") has at least two levels, wherein a relatively lower level is used for finishing the dental blank and a relatively higher level is used for roughing the dental blank.

8. The method according to claim 5, wherein the step shaped supply current (I_tr") has at least two levels, wherein a relatively lower level is used for making partial cut paths in the dental blank and a relatively higher level is used for making full cut paths in the dental blank.

9. The method according to claim 5, wherein the step shaped supply current (I_tr") has at least two levels, wherein a relatively lower level is used for machining with a first type of dental tool and a relatively higher level is used for machining with a second type of dental tool different than the first type of dental tool.

10. The method according to claim 5, wherein the step shaped supply current (I_tr") has at least two levels, wherein a relatively lower level is used for lubricated machining of the dental blank and a relatively higher level is used for dry machining of the dental blank.

11. The method according to claim 5, wherein the step shaped supply current (I_tr") has at least two levels, wherein a relatively lower level is used for a first revolution speed of the dental tool and a relatively higher level is used for a second revolution speed of the dental tool different than the first revolution speed.

12. The method according to claim 5, wherein the step shaped supply current (I_tr") has at least two levels, wherein a relatively lower level is used for a first type of material of the dental blank and a relatively higher level is used for a second type of material of the dental blank different than the first type of material.

13. The method according to claim 5, wherein the step shaped supply current (I_tr") has at least two levels, wherein a relatively lower level is used for a relatively low acceleration of a carriage of the dental tool and a relatively higher level is used for a relatively high acceleration of the carriage of the dental tool.

14. The method according to claim 5, wherein the step shaped supply current (I_tr") has at least two levels, wherein a relatively lower level is used for a first velocity of a carriage of the dental tool and a relatively higher level is used for a second velocity of the carriage of the dental tool different than the first velocity.

15. The method according to claim 5, wherein the step shaped supply current (I_tr") has at least two levels, wherein a relatively lower level is used for a low jerk in the trajectory of a carriage of the dental tool and a relatively higher level is used for a high jerk in the trajectory of the carriage of the dental tool.

16. A dental tool machining system comprising: a dental tool machine for removing material from at least one dental blank, wherein the dental tool machine has one or more stepper motors for driving a carriage that movably holds one or more dental tools and one or more stepper motors for driving a retainer which movably holds the dental blanks; a control means for operating the stepper motors; wherein the control means is further adapted to operate the stepper motors in accordance with claim 1.

17. A program comprising computer readable codes for causing a computer-based dental tool machine to carry out the method steps according to claim 1.

18. A non-transitory computer readable storage medium which stores the program according to claim 17.

\* \* \* \* \*